United States Patent [19]

Sacks

[11] 4,362,202
[45] Dec. 7, 1982

[54] SEMI-PNEUMATIC TIRE

[75] Inventor: Martin B. Sacks, Claypool, Ind.

[73] Assignee: Sun Metal Products, Inc., Warsaw, Ind.

[21] Appl. No.: 249,024

[22] Filed: Mar. 30, 1981

[51] Int. Cl.³ .............................................. B60C 7/24
[52] U.S. Cl. .................................. 152/325; 152/158;
152/165; 152/329; 152/380
[58] Field of Search ............... 152/325, 323, 327–329,
152/380, 165, 158, 330 RF

[56] References Cited

U.S. PATENT DOCUMENTS

| 2,648,369 | 8/1953 | Todd | 152/325 |
| 2,713,373 | 7/1955 | Dougherty | 152/158 |
| 2,766,802 | 10/1956 | Grobowski | 152/323 |
| 4,305,444 | 12/1981 | Suris | 152/165 |

Primary Examiner—Edward C. Kimlin
Assistant Examiner—Lois E. Boland
Attorney, Agent, or Firm—John S. Fosse

[57] ABSTRACT

A semi-pneumatic tire body for assembly to the rim of a wheel comprises spaced tread and root portions interconnected with spaced sidewalls to define an annular cavity. An annular load-bearing rib is connected to the root portion and extends radially toward the tread portion to be normally spaced apart from the tread portion in the unloaded state in order to establish communication between the internal chambers of the tire for free gaseous interchange and for free response of the tire to load forces.

6 Claims, 3 Drawing Figures

SEMI-PNEUMATIC TIRE

FIELD OF THE INVENTION

This invention relates generally to the configuration of elastomeric tire bodies for use in surfacing wheel rims. The present invention relates more particularly to tubeless tubular tire bodies adapted to contain a gaseous medium at substantially atmospheric pressure.

BACKGROUND OF THE INVENTION

In the past, one style of semi-pneumatic tire has comprised a tubular body which was divided into two completely separate and uninterconnected chambers by means of an internal, radially disposed web. The resultant tire product, while exhibiting many practical advantages, has been found to be difficult to manufacture without incurring an unacceptably high proportion of asymmetrical, warped or non-linear parts. This prior art tire design has also exhibited a tendency to "wander" from its designated track in use, in part as a result of permanent deformation of the central web.

BRIEF DESCRIPTION OF THE INVENTION

The present invention retains the advantages of the prior art tire body described hereinabove while eliminating its shortcomings. The tire body of the instant invention replaces the central, internal web of the prior art with an internal, radially extending, annular rib which provides support and load-distribution for the tread section of the tire body and which resists permanent distortion of the tire body during manufacture as well as in use.

Therefore, a general object of the present invention is to provide a new and improved semi-pneumatic tire body.

Another object of the invention is to provide a semi-pneumatic tire body which affords equalization of internal gas pressure, especially during the final stages of manufacture.

Still another object of the invention is to provide a semi-pneumatic tire which exhibits much of the soft, resilient feel of a fully pneumatic tire.

A still further object of the invention is to provide a semi-pneumatic tire which responds freely to load forces and achieves uniform distribution of such forces.

These and other objects and features of the invention pertain to the particular structures and arrangements by which the foregoing objects are attained.

BRIEF DESCRIPTION OF THE DRAWING

In order that the principles of the invention may be readily understood, a single embodiment thereof, but to which the application is not to be restricted, is shown in the accompanying drawing wherein.

DETAILED DESCRIPTION OF THE INVENTION

According to one set of conventional procedures, semi-pneumatic tires are manufactured by first plasticizing a quantity of polyvinyl chloride resin to an elastomeric state, thereafter heating the resultanl mass to a flowable or plastic condition and forcing it through an extrusion die to form a substantially continuous tubular body of the requisite cross-section. The tire preform emerges from the extrusion die at elevated temperature and is ordinarily cooled in a water bath to reduce the degree of plasticity. Next the extrusion is guillotined to length; and the cut parts are then curled into circular form with the cut ends placed together where they are welded with a hot knife at about 350°–400° F. The resultant tire is further cooled before rim mounting and is designed to be slightly undersize so that the tire may be stretched during rim mounting, relying on tensile forces to secure the tire to the rim.

Figure 1:
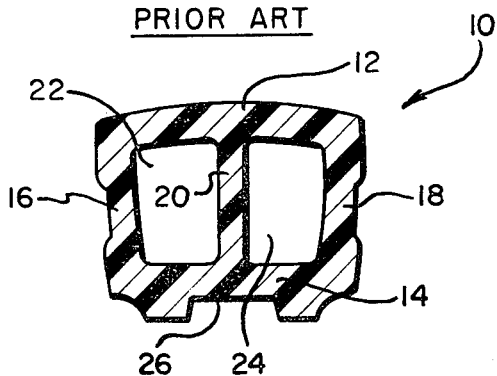
FIG. 1 is a cross-sectional view of a prior art semi-pneumatic tire body.

Turning to a consideration of FIG. 1, a semi-pneumatic tire body, according to one prior art arrangement, is indicated generally by the reference numeral 10 and comprises a tread portion 12, a rim-engaging root portion 14 and laterally spaced, radial sidewalls 16 and 18 which connect the tread and root portions to cooperate with a central annular web 20 in defining a pair of laterally spaced, hermetically sealed cavities 22 and 24. It is to be appreciated that the web 20 spans and is confluent with both the tread portion 12 and the root portion 14, precluding gaseous interchange between the chambers 22 and 24. In further accord with conventional practice, the root portion 14 is fashioned with a radially inwardly opening channel 26 for fittedly receiving a rim key in mounting the tire body to a wheel.

In manufacture, the semi-pneumatic tire body 10 carries adhering water droplets from the cooling tank to the welding station; and upon contact with the heated welding knife, these water droplets vaporize forming steam in the chambers 22 and 24. When the vapor pressures in the chambers 22 and 24 caused by the generated steam are unequal, twisting of the tire body, while it is still hot and plastic results; and in extreme cases of such distortion, rejection of as much as 50% of a production run has been experienced due to asymmetrical, warped or non-linear tire bodies. Substantial manufacturing inefficiencies result, even though the scrap parts may be ground and remelted with virgin resin at a fraction of the charge to the extrusion die.

In addition, stretching or tensile forces from the rim mounting operation appear at the tread portion 12 and are transmitted to the root portion 14 and the wheel rim itself through the web 20 and the sidewalls 16 and 18. These forces tend to distort the shape of the tire body. Loading in use also tends to distort the web 20 from a strictly radial plane because the web acts to restrict free flexing of the tire body. Any distortion of the tire body 10 from a generally toroidal configuration, regardless of cause, produces a tire having a tendency to wander from a linear path or to fail to track upon itself in use.

Figure 3:
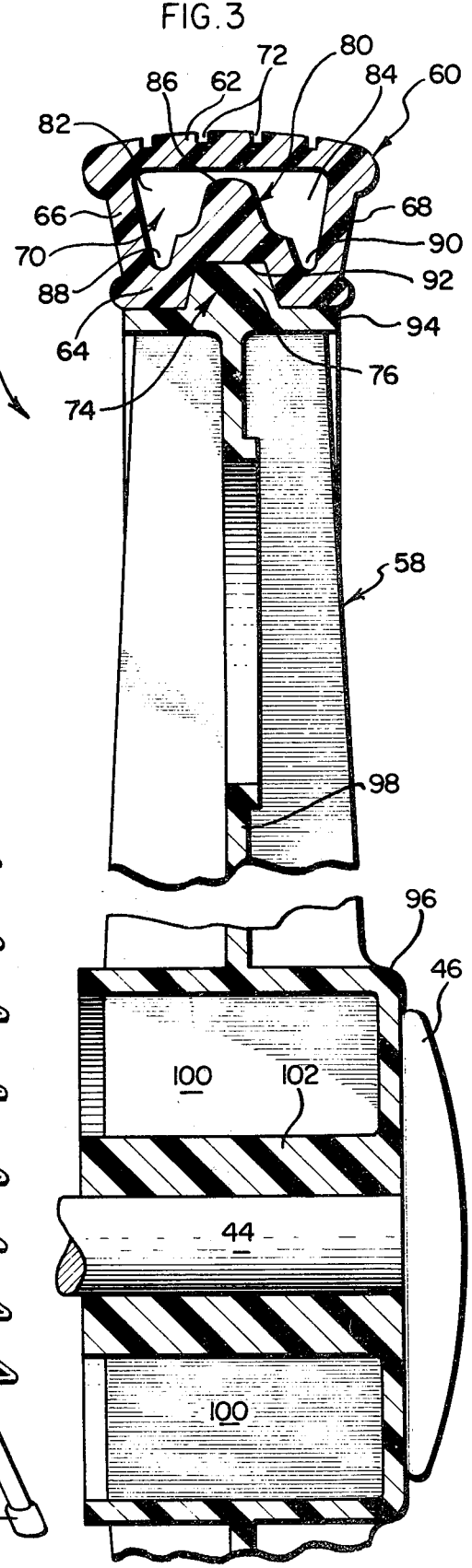
FIG. 3 is an enlarged view taken in cross-section substantially along the line 3—3 of FIG. 2 and illustrating specific details of the tire of the invention.
Figure 2:
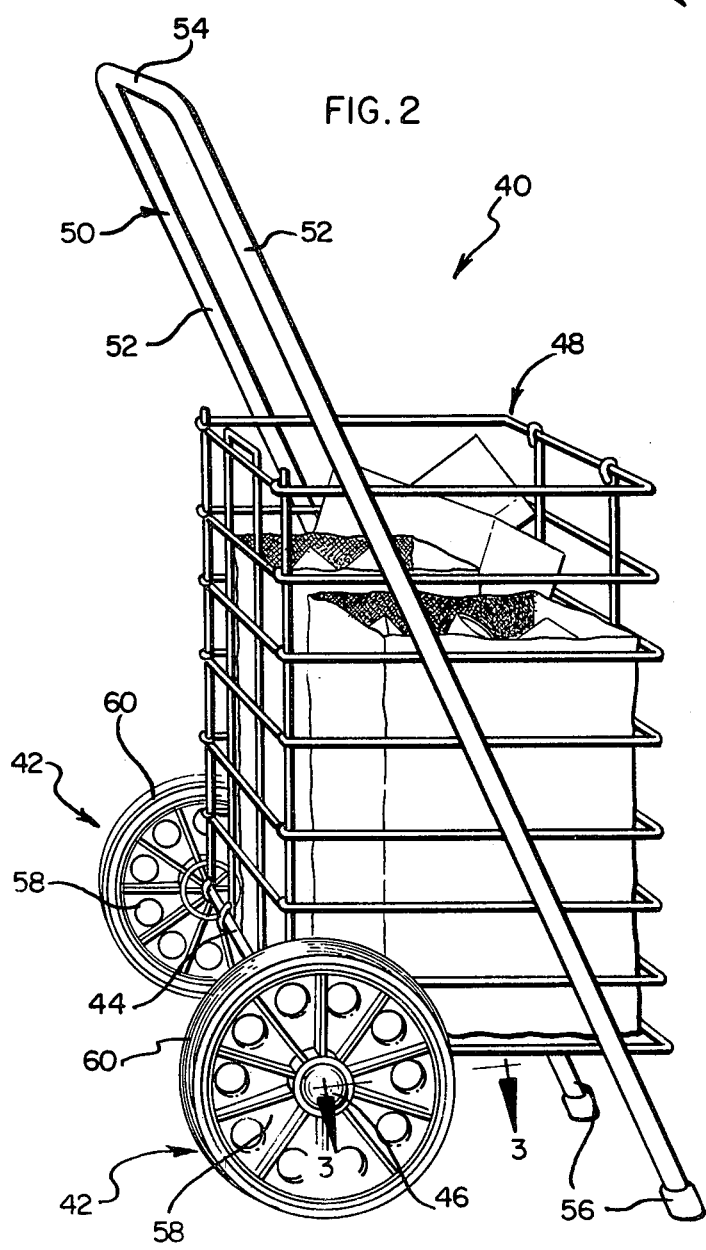
FIG. 2 is a perspective view of a shopping cart mounted on wheels having semi-pneumatic tires constructed in compliance with the present invention.

The pneumatic tire of the present invention overcomes the described limitations of the prior art tire body 10; and turning to FIGS. 2 and 3 for a detailed description of the present invention, a shopping cart 40 is shown rollably supported on a pair of semi-pneumatic tired wheels 42 which are journaled on an axle 44 and which are held in place by snap-on hubs 46.

In addition to the rollable undercarriage, the shopping cart 40, in compliance with conventional practice, comprises a tubular, rectangular, wirework container 48 and a U-shaped handle bracket 50. The handle bracket 50 includes spaced, parallel arms 52 and a connecting bight 54, the arms 52 terminating in rubber-capped feet 56 that serve as the forward downstops.

Each of the wheels 42 includes a wheel body 58 having mounted on its periphery an endless annular semi-pneumatic tire 60; and with particular reference to FIG. 3, the tire 60 comprises an annular, ground-engaging tread portion 62; an annular, rim-engaging root portion 64; and laterally spaced sidewalls 66 and 68 which connect the tread portion and the root portion to define an annular, closed cavity 70 therebetween. The external surface of tread portion 62 is advantageously provided with a tread pattern comprising parallel grooves 72 or other suitable incisements; and the root portion 64 is fashioned with an annular, inwardly opening, centrally disposed channel 74 for fittedly receiving the rim key means 76 of wheel body 58 in the mounting of the tire 60 to the wheel.

In compliance with important features of the present invention, the tire body 60 includes an annular, load-bearing rib 80 which is confluent, in the illustrated embodiment, with the root portion 64, the rib 80 extending radially toward the tread portion 62 to divide the annular cavity 70 into respective lateral chambers 82 and 84. In addition, the rib 80 is provided with a detached tip 86 which is normally spaced apart from the inner wall of the tread portion 62 in the unloaded state of the tire body in order to establish substantially continuous communication between the lateral chambers 82 and 84 for free gaseous interchange.

During welding of the cut ends of the extruded preform during tire manufacture, errant vapor pressure differentials caused by vaporization of droplets of cooling tank water are automatically equalized by means of the continuous interconnection of the lateral chambers 82 and 84. In addition, during use of the semi-pneumatic tire 60 on a wheel body, nascent internal gas pressure differentials are likewise avoided by the continuous interconnection of these lateral chambers. Twisting and distortion of the tire body is thus substantially precluded, and manufacturing rejects are reduced to a desirable extremely low level.

In accordance with further features of the invention, the central internal rib 80 is caused to take a pyramidal cross-section, as is well shown in FIG. 3, with the apex of the pyramid corresponding to the rib tip portion 86. Under load, the tread portion 62 of the tire body is urged into contact with the rib 80; and the forces thus imposed are transmitted to the root portion 64 of the tire body and hence to the wheel rim. The pyramidal shape of the rib 80 promotes a uniform distribution of these forces and a permanent centering of the tire on the wheel rim, thus avoiding deformation of the rib in use and resultant distortion of the tire profile and a meandering track for the wheel. In further accord with the invention, the sidewalls 66 and 68 of the tire body are fabricated to flare generally radially outwardly in order to cooperate in the uniform distribution of load forces.

In still further accord with the present invention, the root portion 64 is fashioned with radially outwardly opening, annular grooves 88 and 90 which are disposed respectively on the opposite sides of the central rib 80. The grooves 88 and 90 open respectively into the chambers 82 and 84, and the roots of these grooves extend radially inwardly beyond the root 92 of key channel 74. This latter arrangement of the grooves 88 and 90 promotes flexing of the tire body in response to unbalanced load forces that may be imposed on the tire.

As will be appreciated from an inspection of FIG. 3, the rib 80 is arranged to take a height beyond root portion 64 which is substantially equal to the radial extent of the sidewalls 66 and 68, i.e. substantially equal to the height dimension of the sidewalls 66 and 68 taken in a plane disposed radially of the wheel body 58 and using the roots of grooves 88 and 90 as a reference or datum for measurement.

Continuing with reference to FIG. 3, the wheel body 58 comprises a circular rim 94 that is confluent with the key 76 and that is braced from a central hub 96 by means of an apertured disc 98, a solid disc, or spokes as desired. The wheel body 58 is desirably fabricated from a suitable metal alloy or an engineering plastic material and is therefore designed with relatively uniform wall sections throughout. Thus, the hub 96 may be relieved with a plurality of radial, pie-shaped openings 100 disposed symmetrically about the shaft-embracing core 102.

As will be appreciated, the instant invention presents a tire body which distributes load forces and internal gas pressure and, in addition, exhibits a soft "pneumatic" feel which results from separation of the rib 80 from the tread portion 62. The tire of the present invention additionally provides a more desirable appearance and achieves a high degree of uniformity in tracking.

The specific embodiment herein shown and described is to be considered as being primarily illustrative. Various changes will, no doubt, occur to those skilled in the art and such changes are to be considered as forming a part of this invention insofar as they fall within the spirit and scope of the appended claims.

The invention is claimed as follows:

1. A semi-pneumatic tire body for assembly to the rim of a wheel, comprising: an annular, ground-engaging tire tread portion; an annular, rim-engaging tire root portion spaced apart from said tread portion in generally radial alignment therewith; laterally spaced sidewalls connecting said tread portion and said root portion to define annular, closed cavity means therebetween; and an annular, load-bearing rib confluent with one of said tire tread portion and said tire root portion and extending radially toward the other of said tire portions and into said cavity means to divide said cavity means into lateral chambers, said rib having a base element and a narrower tip element connected to said base element, detached from said other tire portion and normally spaced apart from the inner wall of said other tire portion in the unloaded state to establish substantially continuous communication between said lateral chambers for free gaseous interchange and said rib having a height substantially equal to the radial extent of said sidewalls whereby to support said other tire portion in the loaded state.

2. A semi-pneumatic tire body according to claim 1 wherein said rib has a pyramidal cross-section with the apex thereof corresponding to the aforesaid rib tip element, whereby to distribute load forces to a cooperating wheel rim in a uniform manner.

3. A semi-pneumatic tire body according to claim 1 wherein said tread portion is configurated with an external, grooved tread pattern.

4. A semi-pneumatic tire body according to claim 1 wherein said root portion defines annular, radially inwardly opening, centrally disposed channel means for fittedly receiving rim key means in mounting the tire to a wheel and wherein said root portion further defines radially outwardly opening groove means disposed on the opposite sides of said rib and opening respectively into said chambers, the roots of said groove means extending radially inwardly beyond the root of said channel means, whereby to promote flexing of said tire body in response to unbalanced load forces imposed on the tire.

5. A semi-pneumatic tire body according to claim 1 wherein said sidewalls flare in the radially outward direction for cooperating with said rib in uniformly distributing load forces.

6. A semi-pneumatic tire body according to claim 1 wherein said rib is confluent with said root portion and wherein said rib tip element is normally spaced apart from said tread portion.

* * * * *